METHOD FOR MAKING INTEGRATED CIRCUIT APPARATUS

Filed Jan. 19, 1968

INVENTORS

*FREDERICK F. JENNY*

*RUDOLF E. THUN*

BY Norman R. Bardales

*ATTORNEY*

United States Patent Office 3,553,830

Patented Jan. 12, 1971

3,553,830

METHOD FOR MAKING INTEGRATED CIRCUIT APPARATUS

Frederick F. Jenny, Endwell, N.Y., and Rudolf E. Thun, Carlisle, Mass., assignors to International Business Machines Corporation, Armonk, N.Y., a corporation of New York Filed Jan. 19, 1968, Ser. No. 699,095

Int. Cl. B01j *17/00;* H01l *7/00*

U.S. Cl. 29—574 6 Claims

ABSTRACT OF THE DISCLOSURE

A method for making integrated circuit apparatus wherein a plurality of integrated circuits are formed on at least one substrate and arranged in groups of circuits with each of the circuits of a particular group being functionally equivalent to the other circuits of the group. Next, the circuits of the group are interconnected in a predetermined parallel operational relationship. The circuits of the group are then commenced to be tested in a sequential manner for one or more desired preselected electrical characteristics. When the first circuit or circuits, as the case might be, of the group are found which have these characteristics, no further testing of the circuits of the group is performed. Thereafter, the circuits of the group are operatively disconnected from the parallel operational relationship with the exception of those circuit or circuits tested and found to have the characteristic(s).

BACKGROUND OF THE INVENTION

This invention relates to a method for making integrated circuit apparatus and more particularly for an improved method thereof for making the interconnections between the good circuits thereof.

As is well known to those skilled in the art, integrated circuits are formed on one or more substrates and the circuits thereof are interconnected by a metallization conductive pattern. In the present state of the art, the yield of a given number of good circuits varies randomly in quantity, as well as their respective locations, from one manufactured batch of substrate or substrates to another. Accordingly, it has been proposed that each of the circuits of the substrate or susbtrates be tested and thereafter the aforementioned metallization conductive pattern be designed and formed on the substrate which interconnects only the good circuits. It has also been proposed that the testing of each of the circuits and the subsequent design and formation of the interconnection pattern between the good circuits be done by automatic means under the control of a programmed computer. However, the number of permutations and combinations of good circuits and their locations and consequently the resultant number of metallization interconnection patterns is such that it is impossible to program each and every one of the possible interconnection patterns into the computer, especially where the number of circuits per substrate is in the order or magnitude of from one hundred to one thousand. By way of example, large scale integration of integrated circuits of the monolithic type are presently being developed with the aforementioned order of magnitude of circuits per substrate. Thus, the aforedescribed approach of the prior art is not readily compatible to automated manufacturing techniques.

SUMMARY OF THE INVENTION

It is an object of this invention to provide a method for making integrated circuit apparatus.

It is another object of this invention to provide a method for making integrated circuit apparatus wherein interconnection of the good circuits thereof is obtained in a rapid, reliable and simplified manner.

Another object of this invention is to provide a method for making integrated circuit apparatus in which a universal metallization interconnection pattern is formed for interconnecting the integrated circuits irrespective of variations in the yield and/or circuit locations of the good circuits thereof for different batches of integrated circuit apparatus having the same circuit pattern configuration.

It is still another object of this invention to provide a method for making integrated circuit apparatus wherein the integrated circuits are of the monolithic type.

Still another object of this invention is to provide a method for making integrated circuits compatible with large scale integrated techniques.

It is still another object of this invention to provide a method for making integrated circuit apparatus which is compatible to automated and/or computer control techniques.

According to the invention there is provided a method for making integrated circuit apparatus. A plurality of integrated circuits are formed on at least one substrate. At least some of the integrated circuits are arranged in one or more predetermined groups with each group having at least two of the circuits. Each of the circuits of a given group are functionally equivalent to the other circuits of the given group. Thereafter, with respect to each group, the circuits of the group are connected in a predetermined parallel operational relationship with the other circuits of the group. Subsequently, testing of the circuits of the group is commenced in a sequential manner. Each of the circuits so tested is tested for a predetermined number of preselected electrical characteristics. The sequential testing of the circuits of the groups is subsequently terminated when a predetermined number of circuits of the group are obtained which have individually the predetermined number of preselected electrical characteristics. The predetermined number of circuits of the group is at least one but less than the total number of circuits associated with the group. Thereafter, the circuits of the group are operatively disconnected from each other except the predetermined number of tested circuits of the group which are found to have the predetermined number of preselected electrical characteristics.

The foregoing and other objects, features and advantages of the invention will be apparent from the more particular description of a preferred embodiment of the invention, as illustrated in the accompanying drawing.

BRIEF DESCRIPTION OF THE DRAWING

In the figures, like elements are designated with similar reference numerals.

DESCRIPTION OF THE PREFERRED EMBODIMENT

Figure 1:
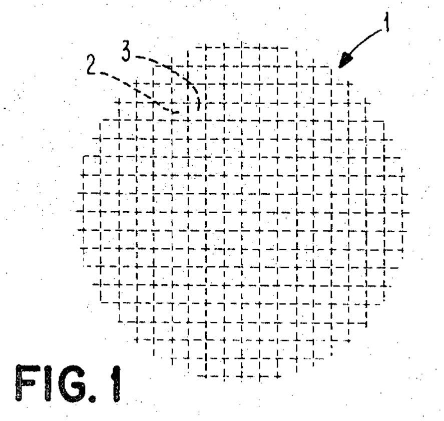
FIG. 1 is a schematic view of a substrate with the integrated circuits formed thereon in accordance with the principles of the present invention.

The invention is described herein with reference to a preferred embodiment wherein the circuits are formed by large scale integration techniques and are of the monolithic type. Accordingly, in FIG. 1 there is illustrated a substrate 1 of silicon or the like having a plurality of integrated circuits formed thereon, the circuits being illustrated in FIG. 1 by the rectangular blocks, e.g. adjacent blocks 2, 3, formed by the horizontal and vertical dash lines shown therein. The integrated circuits are formed by a technique known in the art as a monolithic technique which involves inter alia the use of semiconductor processes, such as solid state diffusion and epitaxial growth, and which technique allows the simultaneous fabrication of all circuit elements. Each of the circuits of FIG. 1 is designed to perform a certain function in the electronic system or sub-system of which it ultimately may become a part. According to the invention, there is provided for each circuit function required by the system or sub-system a group of plural circuits each of which is designed to provide the desired function. The circuits of the group are preferably arranged in a predetermined geometrical relationship with respect to each other and in the preferred embodiment are preferably arranged in an adjacent relationship with respect to each other in the rectangular array of circuits shown in FIG. 1. For example, the circuits associated with the horizontal row containing the adjacent circuits 2, 3 are of the same exclusive group and each is designed to perform the same function.

Figure 2:
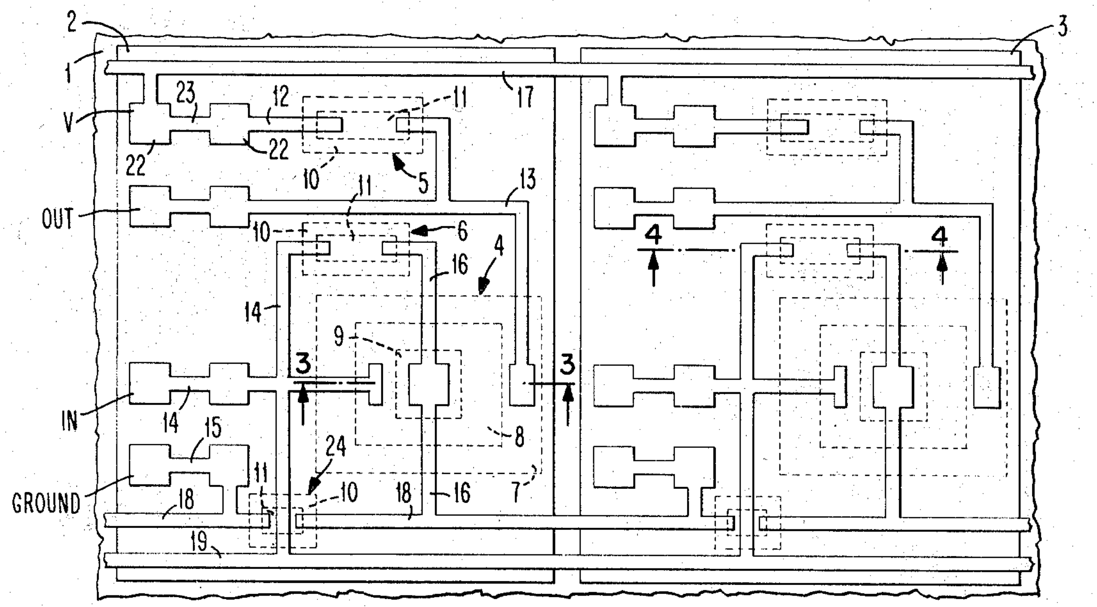
FIG. 2 is a detailed enlarged view of two adjacent circuits of the substrate of FIG. 1.
Figure 3:
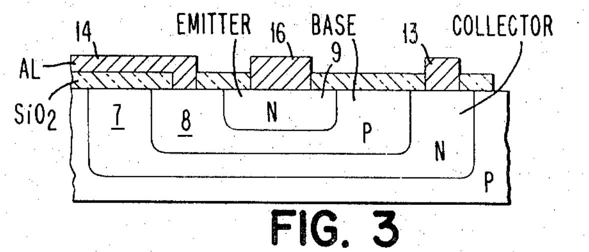
FIG. 3 is a partial cross-sectional view taken along the line 3—3 of FIG. 2.

Referring now to FIG. 2, there is shown in greater detail the adjacent circuits 2, 3, each of which is configured by way of example as a common emitter amplifier circuit having diffused circuit elements 4–6. Element 4 accordingly is a diffused transistor having a collector region 7, a base region 8 and an emitter region 9 shown in outline forms in FIG. 2 and shown more clearly in cross-section in FIG. 3. More specifically, as shown in FIG. 3, the transistor 4 is illustrated by way of example as being of the NPN type diffused into a compatible P type substrate 1.

Figure 4:
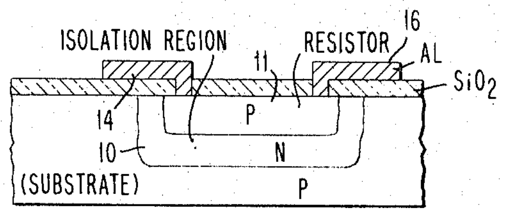
FIG. 4 is a partial cross-sectional view taken along the line 4—4 of FIG. 2.

The elements 5 and 6 are diffused resistors which have an N region 10 and a P region 11 shown thereat in outline forms in FIG. 2, and shown more clearly by the cross-sectional view of the resistor 6 in FIG. 4.

A conductive metallization interconnecting pattern of aluminum or the like intraconnects the elements 4–6 in their proper operational relationship for each circuit. According to the invention, the metallization pattern also interconnects all the circuits associated with the same group in a predetermined parallel operational relationship. Thus, in the preferred embodiment the circuits of the group that are located on the aforementioned horizontal row shown in FIG. 1 which contains circuits 2, 3 are connected in a predetermined parallel operational relationship. More specifically, as shown by the circuit 2 in FIG. 2, the metallization pattern is comprised of flat conductors 12–16 which form the conductors for intraconnecting the circuit elements 4–6 of circuit 2 and conductors 17–19 which form the interconnections to the other circuits of the group. In the preferred embodiment, conductor 17 is a power bus which is connected to the power terminal, e.g. terminal V of circuit 2, of each of the groups and which causes energization of the circuits attached thereto when connected to a power supply, not shown. Conductor 18 is a common ground or return bus which is connected to the common terminals, e.g. terminal GND of circuit 2, of each of the circuits, and conductor 19 is a common input line which is connected to the input terminals, e.g. terminal IN of circuit 2, of each of the circuits of the group. In the given circuit example, the input terminals are connected to the respective base inputs of the transistors of the circuits of the group, thereby placing the inputs of these circuits in a parallel operational relationship. As is customary in this art, the metallization circuit pattern is deposited in the appropriate electrode areas of the transistor 4 and resistors 5, 6. A suitable electrical insulator such as a silicon dioxide layer is placed beneath those parts of the conductive pattern where it is desired that these parts not make electrical contact with the areas of the substrate lying beneath it in a manner well known to those skilled in the art and as shown more clearly in FIGS. 3 and 4.

Figure 5:
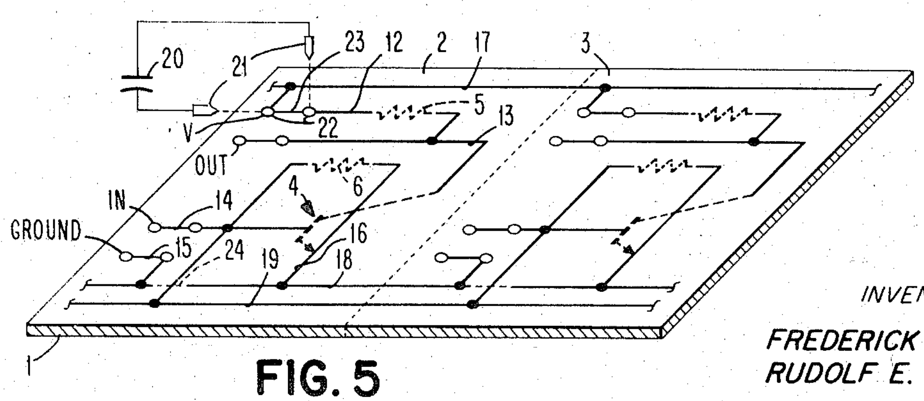
FIG. 5 is a perspective view of the integrated circuits of FIG. 2, the circuits being schematically illustrated therein for sake of clarity, and the diffused components thereof being illustrated in outline form for the same purpose.

In accordance with the invention, the next step is to begin to test the circuits of a group in a sequential manner for one or more preselected electrical characteristics such as, for example, impedance, input/output characteristics, no open or short circuits, etc. As soon as the first circuit of a group is found or the first number of circuits of a group are found which has or individually have the desired characteristic or characteristics, the sequential testing operation is terminated and in accordance with the invention the other circuits of the group are operatively disconnected from the array. By way of example, a circuit may be disconnected by disconnecting it from one or more of the common interconnecting lines 17–19. Generally, disconnecting the circuit from the power supply bus 17 will be sufficient to operatively disconnect the circuit. For example, if it was desired to operatively disconnect circuit 2, the conductor 12 would be severed. By way of example, as shown in FIG. 5, a charged condenser 20 is applied via the probes 21 to the pair of conductor lands 22 of conductor 12. The charge on the condenser 20 is selected to provide a discharge current of sufficient amplitude to melt and sever the small interconnection bridge 23 between the pair of lands 22. Other examples include such means as burn out by a laser beam or severing by an abrasive tool, etc.

It should be understood that the circuit and metallization interconnection pattern illustrated in circuits 2 and 3 in FIGS. 2 and 5 are shown in idealized form and that as is apparent to those skilled in the art, the metallization pattern would be designed to minimize cross-overs and or where cross-overs occur, e.g. cross-over 24, between conductors 18 and 19, a suitable diffused conductive undercrossing would be provided in a manner well known to those skilled in the art. As such, the diffused undercrossing is formed in a manner similar to the resistors 5 and 6 and is considered as a circuit element of the associated integrated circuit of which it is a part.

In practice, the number of circuits provided in each group would be judiciously selected according to the statistical yields of the particular circuit and/or its location in the array. For example, assuming that for a particular circuit and its location, the average minimum circuit yield is 20%, then five of these type circuits would be provided in the group at the appropriate location in the array on the statistical probability that at least one of the five, when tested, will be a good circuit. An advantage of the inventive method is that the pre-designed metallization conductive pattern is universal or constant, i.e. fixed, thereby simplifying the related layout and design work for making the interconnections. According to the invention, it is preferred that the metallization pattern also be provided with other conductors, not shown, that interconnect the circuits of one group to the circuits of the other groups in their intended interconnecting relationship for the desired assembly or subassembly of which the tested good circuits will be ultimately comprised therein. To this end, in the preferred embodiment the integrated circuits are preferably arranged in a rectangular array on a single substrate of horizontal and vertical rows as shown in FIG. 1. Moreover, the aforementioned circuit groups are preferably arranged in mutually exclusive rows of the array which are parallel to each other, the circuits of a group being adjacent to each other in the particular row with which they are associated. This facilitates the layout or formation of the conductive metallization pattern wherein the interconnection of the circuits of the same group is accomplished by appropriate conductors which are substantially parallel to the axis of the associated row and the interconnection of the circuits of one group with the circuits of the other group or groups by conductors which are substantially normal to the axis of the row. In this manner a fixed gridlike metallization pattern is provided and the subsequent testing and/or circuit removal operations is simplified and readily amendable to automated and/or computer controlled techniques.

It should also be understood, however, that the invention could be practiced where just the circuits of the group are interconnected and after the first good circuit or circuits of each of the groups has been determined in the manner previously described, a metallization pattern could be provided to interconnect the good circuits of the different groups.

It should also be understood that while the invention has been described with reference to preferred monolithic integrated circuit types that the method has application to other types of integrated circuits such as hybrid types, thin-film types and/or compatible types which are well known in the art. References such as, for example, "Integrated Circuits: Design Principles and Fabrication," Raymond M. Warner, Jr. and James N. Fordemwalt—McGraw-Hill, 1965, contain a more detailed description of the design and fabrication of monolithic integrated circuit types as well as the other circuit types.

It should also be understood that while the invention has been described wherein the integrated circuits are formed on a single substrate and/or single layer that the invention may be practiced where the integrated circuits are formed on a plurality of substrates and/or layers and/or wherein the integrated circuits having the same functions are arranged in groups of which some of the circuits of a given group or groups are located on one of the substrates or layers and others of the circuits of the given group or groups are located on other substrate(s) and/or other layer(s), the interconnection pattern between layers or substrates being implemented by conductive plated through holes, also known in the art as via holes.

Thus, while the invention has been particularly shown and described with reference to a preferred embodiment, it will be understood by those skilled in the art that the foregoing and other changes in form and details may be made therein without departing from the spirit and scope of the invention.

We claim:

1. A method for making integrated circuit apparatus, said method comprising:

the step of providing a plurality of integrated circuits formed on at least one substrate, at least some of said integrated circuits being arranged in at least one group, said group having at least two circuits, each of the circuits of said group being functionally equivalent to the other circuits of the group;

interconnecting each circuit of said group in a predetermined parallel operational relationship with the other circuits of the group, thereafter commencing the testing of the circuits of said group in a sequential manner for a predetermined number of preselected electrical characteristics, thereafter terminating the testing of the circuits of the group when a predetermined number of circuits of the group are obtained which have individually the predetermined number of preselected electrical characteristics, said predetermined number of circuits of the group being at least one and less than the total number of circuits of the group, and thereafter operatively disconnecting the circuits of the group except for said predetermined number of tested circuits of the group individually having the predetermined number of preselected characteristics.

2. A method according to claim 1 further comprising the step of interconnecting the circuits of the group in a preselected interconnected relationship to at least one of the other circuits not of said group prior to the commencement of the testing of the circuits of said group.

3. A method for making integrated circuit apparatus, said method comprising:

the step of providing a plurality of integrated circuits formed on at least one substrate, at least some of said integrated circuits being arranged in predetermined groups of at least two circuits each, each of the circuits of a group being functionally equivalent to the other circuits of the group; and thereafter with respect to each group the steps of:

interconnecting each circuit of the group in a predetermined parallel operational relationship with the other circuits of the group, thereafter commencing the testing of the circuits of a group in sequential manner for a predetermined number of preselected electrical characteristics, thereafter terminating the testing of the circuits of the groug when a predetermined number of circuits of the group are obtained which have individually the predetermined number of preselected electrical characteristics, said predetermined number of circuits of the group being at least one and less than the total number of circuits of the group, and thereafter operatively disconnecting the circuits of the group except said predetermined number of tested circuits of the group individually having the predetermined number of preselected characteristics.

4. A method according to claim 3 further comprising the step of:

interconnecting the circuits of the different groups in a preselected interconnected relationship prior to the commencement of the testing of the circuits of said groups.

5. A method for making large scale integrated circuit apparatus, said method comprising:

the step of providing a plurality of monolithic integrated circuits formed on at least one substrate, said integrated circuits being arranged in rows, each of the circuits of a row being functionally equivalent to the other circuits of the row; and thereafter with respect to each row the steps of:

interconnecting each circuit of the group by a metallization conductive pattern in a predetermined parallel operational relationship with the other circuits of said row, thereafter commencing the testing of the circuits of a row in a sequential manner for a predetermined number of preselected electrical characteristics, thereafter terminating the testing of the circuits of the row when a predetermined number of circuits are obtained which have individually the predetermined number of preselected electrical characteristics, said predetermined number of circuits of the row being at least one and less than the total number of circuits of the row, and thereafter operatively disconnecting the circuits of the row except said predetermined number of tested circuits of the row individually having the predetermined number of preselected characteristics.

6. A method according to claim 5 further comprising the step of interconnecting circuits of the rows with said conductive metallization pattern in a preselected interconnected relationship prior to the commencement of the testing of the circuits of said rows.

(References on following page)

References Cited

UNITED STATES PATENTS

| | | | |
|---|---|---|---|
| 2,982,002 | 2/1961 | Shockley | 29—574 |
| 3,134,077 | 5/1964 | Hutchins et al. | 29—574 |
| 3,377,513 | 4/1968 | Ashby et al. | 29—574 |
| 3,423,822 | 1/1969 | Davidson et al. | 29—574 |
| 3,440,715 | 4/1969 | Seng | 29—574 |

JOHN F. CAMPBELL, Primary Examiner

W. TUPMAN, Assistant Examiner

U.S. Cl. X.R.

29—577; 317—234